(12) United States Patent
Smith

(10) Patent No.: US 8,930,717 B2
(45) Date of Patent: Jan. 6, 2015

(54) SECURE PROCESSING MODULE AND METHOD FOR MAKING THE SAME

(75) Inventor: Fred Hewitt Smith, Old Town, ME (US)

(73) Assignee: Angel Secure Networks, Inc., Old Town, ME (US)

( * ) Notice: Subject to any disclaimer, the term of this patent is extended or adjusted under 35 U.S.C. 154(b) by 0 days.

(21) Appl. No.: 13/410,204

(22) Filed: Mar. 1, 2012

(65) Prior Publication Data

US 2012/0227117 A1     Sep. 6, 2012

Related U.S. Application Data

(60) Provisional application No. 61/447,767, filed on Mar. 1, 2011.

(51) Int. Cl.
*G06F 11/273*     (2006.01)
*G06F 21/30*      (2013.01)
*H01L 21/66*      (2006.01)
*G06F 21/57*      (2013.01)
*G06F 21/76*      (2013.01)
*H04L 29/06*      (2006.01)
*G06F 21/56*      (2013.01)
*G06F 9/02*       (2006.01)

(52) U.S. Cl.
CPC ........ *G06F 21/76* (2013.01); *G06F 2221/2115* (2013.01); *G06F 21/305* (2013.01); *H01L 22/20* (2013.01); *G06F 21/57* (2013.01); *H04L 63/126* (2013.01); *G06F 21/56* (2013.01)
USPC ............................................ 713/192; 726/26

(58) Field of Classification Search
CPC ..................................... G03F 1/80; G03F 1/82
See application file for complete search history.

(56) References Cited

U.S. PATENT DOCUMENTS 4,408,203 A     10/1983   Campbell
4,658,093 A      4/1987   Hellman
(Continued)

FOREIGN PATENT DOCUMENTS

EP     0703531     3/1996
EP     0778512     6/1997

OTHER PUBLICATIONS

Security FPGA Analysis. Wanderley et al. Springer Science+ Business Media B.V.(2011).*

(Continued)

*Primary Examiner* — Venkat Perungavoor
(74) *Attorney, Agent, or Firm* — Guntin & Gust, PLC; Ralph Trementozzi

(57) ABSTRACT

Described herein are devices and techniques related to implementation of a trustworthy electronic processing module. During fabrication, a manufacturer is provided with partial technical specifications that intentionally exclude at least one critical design feature. Fabrication of the electronic processing module is monitored from a trusted remote location; wherefrom, the intentionally excluded at least one critical design feature is implemented, thereby completing manufacture of the trustworthy electronic processing module. At least one of the acts of monitoring and implementing can be accomplished by instantiating executable software remotely from a trusted remote location and immediately prior to execution. It is the executable software that enables at least one of the acts of monitoring and implementing. Further, the instantiated executable software is removed or otherwise rendered inoperable immediately subsequent to execution. In some embodiments the critical design feature can be implemented within a configurable element, such as a field programmable gate array (FPGA).

17 Claims, 5 Drawing Sheets

(56) References Cited

U.S. PATENT DOCUMENTS

| | | | |
|---|---|---|---|
| 4,696,003 A | 9/1987 | Kerr et al. |
| 4,731,880 A | 3/1988 | Ault et al. |
| 4,962,498 A | 10/1990 | May |
| 4,999,806 A | 3/1991 | Chernow et al. |
| 5,001,755 A | 3/1991 | Skret |
| 5,005,122 A | 4/1991 | Griffin et al. |
| 5,023,907 A | 6/1991 | Johnson et al. |
| 5,155,847 A | 10/1992 | Kirouac et al. |
| 5,247,683 A | 9/1993 | Holmes et al. |
| 5,301,247 A | 4/1994 | Rasmussen et al. |
| 5,317,744 A | 5/1994 | Harwell et al. |
| 5,388,211 A | 2/1995 | Hornbuckle |
| 5,416,842 A | 5/1995 | Aziz |
| 5,421,009 A | 5/1995 | Platt |
| 5,438,508 A | 8/1995 | Wyman |
| 5,452,415 A | 9/1995 | Hotka |
| 5,495,610 A | 2/1996 | Shing et al. |
| 5,509,070 A | 4/1996 | Schull |
| 5,509,074 A | 4/1996 | Choudhury et al. |
| 5,548,649 A | 8/1996 | Jacobson |
| 5,594,866 A | 1/1997 | Nugent |
| 5,638,512 A | 6/1997 | Osman et al. |
| 5,671,279 A | 9/1997 | Elgamal |
| 5,706,507 A | 1/1998 | Schloss |
| 5,708,709 A | 1/1998 | Rose |
| 5,708,780 A | 1/1998 | Levergood et al. |
| 5,710,883 A | 1/1998 | Hong et al. |
| 5,732,275 A | 3/1998 | Kullick et al. |
| 5,737,706 A | 4/1998 | Seazholtz et al. |
| 5,748,896 A | 5/1998 | Daly et al. |
| 5,826,014 A | 10/1998 | Coley et al. |
| 5,864,747 A | 1/1999 | Clark et al. |
| 5,909,589 A | 6/1999 | Parker et al. |
| 5,974,250 A | 10/1999 | Angelo et al. |
| 6,067,582 A | 5/2000 | Smith |
| 6,324,647 B1 | 11/2001 | Bowman-Amuah |
| 6,532,543 B1 | 3/2003 | Smith |
| 6,668,325 B1 | 12/2003 | Collberg et al. |
| 6,842,862 B2 | 1/2005 | Chow et al. |
| 6,918,038 B1 | 7/2005 | Smith |
| 7,117,535 B1 | 10/2006 | Wecker |
| 7,124,445 B2 | 10/2006 | Cronce et al. |
| 7,149,308 B1 | 12/2006 | Fruehauf et al. |
| 7,170,999 B1 | 1/2007 | Kessler et al. |
| 7,233,948 B1 | 6/2007 | Shamoon et al. |
| 7,328,453 B2 | 2/2008 | Merkle et al. |
| 7,370,360 B2 | 5/2008 | Van der Made |
| 7,913,305 B2 | 3/2011 | Bodorin et al. |
| 2003/0126457 A1 | 7/2003 | Kohiyama et al. |
| 2003/0188187 A1 | 10/2003 | Uchida |
| 2003/0212902 A1 | 11/2003 | Van der Made |
| 2003/0221121 A1 | 11/2003 | Chow et al. |
| 2003/0236986 A1 | 12/2003 | Cronce et al. |
| 2004/0111613 A1 | 6/2004 | Shen-Orr et al. |
| 2005/0097441 A1 | 5/2005 | Herbach et al. |
| 2006/0005250 A1 | 1/2006 | Chu |
| 2006/0005252 A1 | 1/2006 | Chu et al. |
| 2006/0095790 A1 | 5/2006 | Nguyen et al. |
| 2007/0234070 A1 | 10/2007 | Horning et al. |
| 2009/0237203 A1 | 9/2009 | Determan et al. |

OTHER PUBLICATIONS

New Chip Brings Military Security to Commercial Processors. Adee, Sally. Apr. 16, 2009.*
5748741 A, May 5, 1998, Johnson, Harold et al.
"Set Tool Kit for Secure Commerce", Bank Systems +Technology, p. 16, May 1996.
"Software Taps Net for Supply Data Sharing", Electronic Buyers News, Section: Purchasing, p. 50, Apr. 22, 1996.
Ali, et al., "Security Enhancement of Remote FPGA Devices by a Low Cost Embedded Network Processor," Iraq J. Electrical and Electronic Engineering, 13 pages, 2013.
Arnow, "DP: A Library for Building Portable, Reliable Distributed Applications", USENIX Tech Conf, pp. 235-247, Jan. 16-20, 1995.
Baentsch et al., "WebMake: Integrating Distributed Software Development in a Structure-enhanced Web", Computer Networks and ISDN Systems 27, pp. 789-800, 1995.
Bernstein, "Let's Talk: Interapplication Communications in C++ Using X Properties", The X Journal, pp. 37-44, Jan. 2, 1996.
Bryant, "Am I Bid Six? Click to Bid Six!", The New York Times, Section D1, May 13, 1996.
Chii-Ren Tsai et al., Distributed Audit with Secure Remote Procedure Calls, pp. 154-160, XP000300426, Oct. 1991.
Chris Jones, "Licensing Plan Flows from Stream", Infoworld, Section: News, May 6, 1996.
D. Trommer, "ECS Catalog Merges EDI/Net Platforms, Electronic Buyers News", Section: Purchasing, p. 54, May 20, 1996.
Dagenais et al., "LUDE: A Distributed Software Library", Usenix Tech Conf, pp. 25-32, Nov. 1-5, 1993.
DellaFera et al, "The Zephyr Notification Service", Usenix Winter Conference, Feb. 9-12, 1988.
Diane Trommer, "GE/Netscape Form Software Venture", Electronic Buyers News, Section: Online @EBN, p. 54, Apr. 22, 1996.
Eirich, "Beam: A Tool for Flexible Software Update", Usenix Tech Conf, pp. 75-82, Sep. 19-23, 1994.
Ellen Messmer, "Active X Pioneer Pushes Commerce", Network World, p. 33, May 6, 1996.
Flohr "Electric Money", BYTE, pp. 74-84, 1996.
Lodin, "The Corporate Software Bank", Usenix Tech Conf, pp. 33-42, Nov. 1-5, 1993.
M. Takahata et al., Real-Time Video-On-Demand System based on Distributed Servers and an Agent-Oriented Application, vol. 2663, 31 pp. 242-251, Jan. 1996.
Maeda et al., "Service without Servers", IEEE, 4m IEEE Workshop on Workstation Operating Systems, pp. 170-176, Aug. 1, 1993.
Marshall, "Banking on the Internet", Communications Week, p. 1, May 20, 1996.
Messmer, "Edify Software to Let Banks Open Doors Online", Network World, p. 16, May 20, 1996.
Messmer, "Start-up puts security SOCKS on Windows apps", NE, 39, May 20, 1996.
Michael B. Jones, "Interposition Agents: Transparently Interposing User Code at the System Interface", 14th ACM Symposium on Operating Systems Principals, pp. 80-93, 1993.
Nachbar, "When Network File Systems Aren't Enough: Automatic Software Distribution Revisited", Usenix Tech. Conf., pp. 159-171, Summer 1986.
Nash et al., "Vendors Deliver IS-specific apps over the 'net", Computer World, Section: News, p. 16, May 6, 1996.
Noble et al., "A Programming Interface for Application-Aware Adaptation in Mobile Computing", USENIX Association, vol. 8, No. 4, pp. 345-363, Fall 1995.
One Click Software Via the Web, Datamation, p. 16, May 1, 1995.
Ozer, Online Software Stores, PC Magazine, Section: Trends, p. 36, May 28, 1996.
Rodriguez, "Pushing the Envelope", Communications Week, Section: Internet/ Internet, p. 37, May 31, 1996.
Rupley, "Digital Bucks? Stop Here", PC Magazine, Section: First Looks, p. 54, May 28, 1996.
Semilof, "Boosting Web Business", Communications Week, Section: News Brief, p. 31, May 20, 1996.
Silwa, "Netscape Unveils New 'New Commerce Offerings", Networld World, Section: Internet News, p. 10, May 13, 1996.
Stream International Inc., Stream, LitleNet, BBN, and KPMG Announce Industry-Wide Initiative to Enable Wide-Scale Software Electronic Commerce, http://www.stream.com, May 12, 1996.
Tim Clark, "The Big Sell, Software Online", INTER@CTIVE Week, pp. 31-35, Apr. 22, 1996.
Turoff et al, "An Electronic Information Marketplace", North Holland Computer Networks and ISDN Systems 9, pp. 79-90, 1985.
Wexler, "AT&T Sells Insurers on the Web", Network World, p. 27, May 20, 1996.
Wong, "Local Disk Depot-Customizing the Software Environment", USENIX Tech Conf, pp. 51-55, Nov. 1-5, 1993.
Yamada et al, "Electronic Distribution Program on tap", Computer Reseller News, pp. 1 and 169, Apr. 29, 1996.

* cited by examiner

SECURE PROCESSING MODULE AND METHOD FOR MAKING THE SAME

RELATED APPLICATIONS

This application claims priority to U.S. Provisional Patent Application No. 61/447,767, filed on Mar. 1, 2011. The entire teachings of the provisional application are incorporated herein by reference.

STATEMENT OF GOVERNMENT RIGHTS

This invention was made with Government support under Contract No. FA8650-09-C-1638 awarded by the Air Force Materiel Command, Air Force Research Laboratory. The Government may have certain rights in this invention.

TECHNICAL FIELD

This application relates generally to the field of computers. More particularly, this application relates to the technology of establishing secure electronic processors.

BACKGROUND

Secure processor design goes back to the IBM 4758, which embedded certain protected information, or "secrets," in a read only memory (ROM), protected the processor with an enveloping anti-tamper mesh, which destroyed the secrets upon tamper detection. Additionally, the IBM 485 employed a one-way ratcheting process to use the secrets in booting operating systems and loading application software.

Fabrication of such devices, generally requires that the protected information be installed prior to application of the anti-tamper mesh, for example, during fabrication. At least one disadvantage with such an approach is that the fabrication facility must be protected from unauthorized to ensure that the secrets are not discovered, or otherwise tampered with. Additionally, modification of such protected information can be limited by the presence of any anti-tamper mesh.

SUMMARY

There is need for new and more effective methods and systems for protecting hardware from being obtained by a hostile party and/or being reverse-engineered. Preferably allowing for fabrication of such devices at facilities that may not be protected or otherwise securable. Such an advantage would generally avoid an otherwise expensive proposition of maintaining a controlled facility and otherwise limiting fabrication options also tending to increase costs.

The devices and techniques of the disclosure allow for fabrication of electronic processing modules that can be remotely tested and verified during manufacturing and data loading an a controlled manner to prevent the hiding of malware in one or more of the hardware portion of the processor (e.g., the chip) or any loaded firmware. Such modules are preferably configured to guard against such malware introduction through the manufacturing processing. For example, such features can be accomplished by remotely monitoring manufacturing processes and processor design to detect data surreptitiously sent from hidden malware, as will be discussed in more detail below.

In one aspect, at least one embodiment described herein provides a process for making a trustworthy electronic processing module. The process includes providing a manufacturer with a partial technical specification, intentionally excluding at least one critical design feature. Manufacture of the electronic processing module is monitored from a trusted remote location. The intentionally excluded at least one critical design feature is implemented remotely, from a trusted remote location, thereby completing manufacture of the trustworthy electronic processing module.

In at least some embodiments, at least one of the acts of monitoring and implementing are accomplished by instantiating executable software remotely from a trusted remote location and immediately prior to execution. It is the executable software that enables at least one of the acts of monitoring and implementing. Further, the instantiated executable software is removed or otherwise rendered inoperable immediately subsequent to execution.

In yet another aspect, at least one embodiment described herein provides a trustworthy electronic processing module. The electronic processing module includes a processor adapted to execute pre-programmed instructions. The processing module also includes an integral configurable element in communication with the processor. Normal operation of the electronic processing module are impossible without proper configuration of the integral configurable element. The processing module also includes a memory in communication with the processor, and configured with a controlled-access agent process (ANGEL) adapted to enable communication between the electronic processing module and the trusted remote location.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DESCRIPTION OF THE DISCLOSURE

Figure 1:
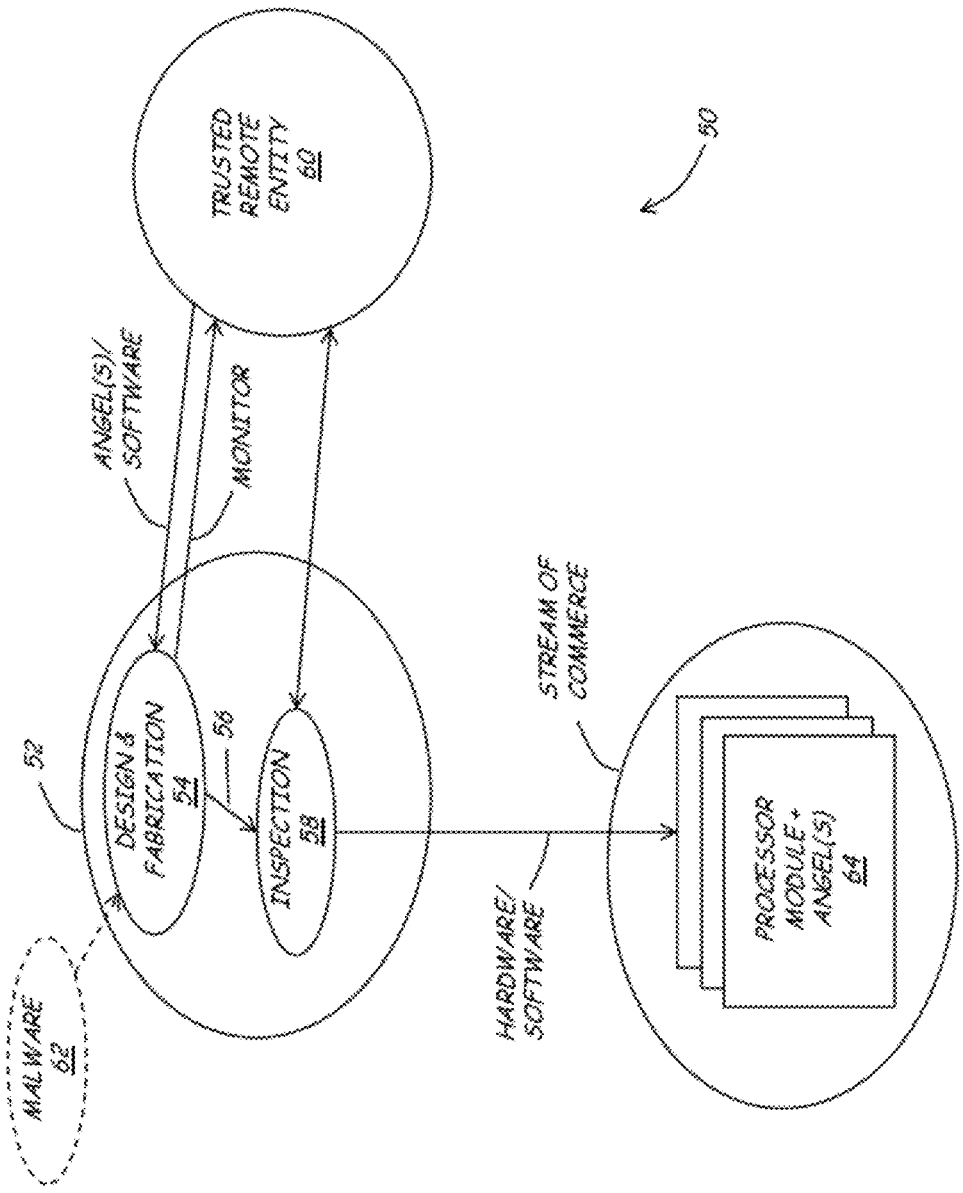
FIG. 1 presents a functional block diagram of an embodiment of a system for ensuring during fabrication trustworthiness of electronic processor module.
Figure 2:
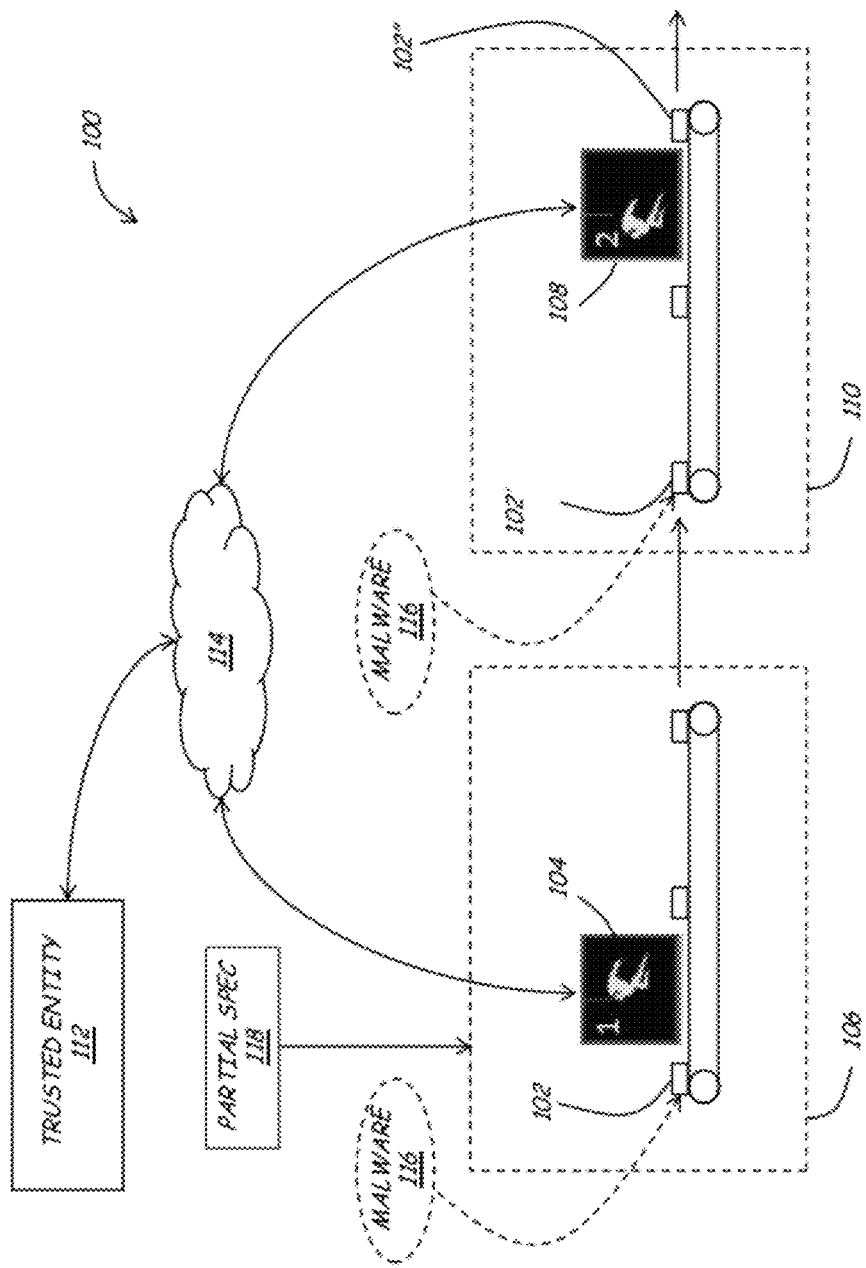
FIG. 2 presents a functional block diagram of another embodiment of a system for ensuring during fabrication trustworthiness of electronic processor module.

In the following detailed description of the preferred embodiments, reference is made to accompanying drawings, which form a part thereof, and within which are shown by way of illustration, specific embodiments, by which the invention may be practiced. It is to be understood that other embodiments may be utilized and structural changes may be made without departing from the scope of the invention.

The particulars shown herein are by way of example and for purposes of illustrative discussion of the embodiments of the present disclosure only and are presented in the case of providing what is believed to be the most useful and readily understood description of the principles and conceptual aspects of the present disclosure. In this regard, no attempt is made to show structural details of the present disclosure in more detail than is necessary for the fundamental understanding of the present disclosure, the description taken with the drawings making apparent to those skilled in that how the several forms of the present invention may be embodied in practice. Further, like reference numbers and designations in the various drawings indicate like elements.

Described herein are embodiments of processes and devices related to fabrication of processor modules adapted for trusted networking with other such modules and with other networked devices. In some embodiments, the processor module is implemented on an electronic circuit board. Alternatively or in addition, the processor module can be implemented on an integrated circuit (i.e., a chip) or a sub assembly of one or more such chips on a substrate. In some embodiments, an integrated circuit embodiment includes an application specific integrated circuit (ASIC), configured with a Secure Processor ANGEL Network (SPAN) feature that enables trusted networking with other such chips and with other Internet devices.

As used herein, a SPAN chip refers to a secure processor chip, with at least some embodiments based on a SiCore SHIELD secure coprocessor board with embedded ANGEL networking technology. SPAN chip sets up secure network with other chips and establishes end-to-end trust, permits no leakage, will not run malware, secrets are secure.

The SPAN chip is remotely tested and verified during manufacturing & data loading to prevent hiding of malware in chip or loaded firmware. The chip is configured to guard against malware introduced during manufacturing processing. For example, this can be accomplished by remotely monitoring manufacturing processes and chip design to detect data surreptitiously sent from hidden malware. Secure loading process and equipment can be used to do this. For example, in at least some embodiments, ANGEL DASH technology remotely monitors authenticity of loaded software. With respect to leak information, chip design comes from SiCore SHIELD board, which is based on Smith/Weingart architecture, first proven in IBM 4758 design. DASH can be configured to monitor one or both of firmware and software, essentially preventing malware from running.

In at least some embodiments, certain equipment is provided to modify the chip manufacturing process to provide an opportunity to remotely monitor chip manufacture to assure that the manufactured chip does not contain unintended malware. The chip can be configured to take advantage of such equipment, thus allowing for the manufacture of chips in environments which are not trusted, or adding another layer of trust to manufacturing environments which are trusted. A SPAN chip manufactured according to such procedures will ensure that it does not contain hidden "back doors" that are not in the manufacturing specification.

Two members of the team that developed the IBM 4758, Dr. Sean Smith and Steve Weingart, were instrumental in developing SiCore secure processor. The current SiCore design (SHIELD) significantly advances the Smith/Weingart design and performance. The SPAN chip design incorporates a subset of SHIELD features plus additional features to incorporate Distributed ANGEL Secure Content Delivery and Host Authentication (DASH) technology and to monitor the manufacturing process.

DASH is another method of protecting secrets on remote assets, including secure processors. DASH involves developing key material from complex networks interacting with hardware devices. DASH has currently been implemented on embedded hardware targeted for deployment in Department of Defense (DoD) assets. DASH can be used to enhance the security of the SiCore design, for example, to build the equipment that will permit secure manufacturing in un-trusted facilities, and to provide tools to enable trusted communication over the Internet. DASH technology is described in one or more of U.S. Pat. Nos. 6,532,543 and 7,841,009 incorporated herein by reference in their entireties.

Just in Time Values and Installation. Values are supplied just in time, which means as close to the time the values is used as is possible under the circumstances, so that the life time of these values is as minimal as possible.

Minimal Exposure. The protected software is exposed in a decoded state for the minimal time required for the software to perform its function.

Orthogonal Authentication. The target environment is supplied with cryptographic and other values which the enemy cannot duplicate. Orthogonal authentication means supplying values taken or derived from or produced by systems that are unrelated (orthogonal) to the system which is to be protected. Orthogonal Authentication is used throughout this invention.

ANGEL. Anonymous Networked Global Electronic Link. An agent that communicates with a remote sever using encrypted packages for which the keys that are periodically strobed. The Anonymous part of the acronym refers to the fact that the location of the server is known only to the ANGEL. The standard ANGEL (Type 1, Single Processor) is an agent which can be installed only once in a predefined location and can be run only once from a predefined target. The parallel ANGEL (Type 2, Multiple Processors) is an ANGEL which is located in a share directory on a cluster, and is executed from the share directory by the various nodes in the cluster.

The SPAN chip can be configured to achieve end-to-end trusted communications between two SPAN chips or between a SPAN chip and another device. The trust is based on a secure processor chip whose design can be proven not to contain malware and which can be proven to be running authenticated software. In particular certain modifications to the chip manufacturing process can be made to assure that the chip does not contain hidden malware, and to design the chip to take advantage of these modifications. To the Applicant's knowledge, this is a completely new approach to the problem of assuring the provenance of chip manufacturing. In at least some embodiments, a chip design is implemented as an ASIC to lower the cost to a point where the chip can be widely deployed, for example, in routers, embedded systems and other devices that can be networked, including possibly even smart phones and commodity computers. The SPAN chip can be used in many applications and it can be securely configured using DASH technology to have capabilities tailored to specific applications.

SiCore presently produces a secure processor on a board. An anti-tamper membrane envelops the entire board. The SiCore board has other protective features as well, such as the ability not to leak data to side channel attacks and the ability to detect various types of electronic illumination. A similar design process is extended from a board implementation to a chip (e.g., an ASIC).

In at least some embodiments, the present SiCore design is enhanced to make maximum use of ANGELs and other DASH techniques to support trusted end-to-end networking. Such a technical approach to enable automated secure remote manufacture of a trusted chip is through redesign both of the chip and the manufacturing process to prevent hidden malware. DASH technology is designed to conduct secure operations in an un-trusted remote environment.

An ASIC chip that contains a secure processor is placed inside a suitable cover, membrane or mesh, for example, similar at least in function to the protection offered in the SiCore board design. In some embodiments, the mesh is configured to detect intrusions into its space, even without the application of chip power. The secure processor can also be configured so as not to leak data to side channel attacks. Preferably, any memory or processor element of the secure processor cannot be invaded without hardware within the chip detecting the attack. For example, in at least some embodiments DASH software is running inside the chip. If an attack is detected, the DASH software is configured to assure that the secure processor changes its state in a manner such that an adversary cannot return the chip to its pre-attack state. As a result of the state change, other remote SPAN chips or devices with DASH software can remotely determine if an attack occurred on a particular SPAN chip.

In at least some embodiments, the SPAN chip contains agent executables (e.g., ANGELs). The ANGELs can set up encrypted communication with other ANGELs. ANGELs can verify the identity of other ANGELS without sending secret identity information, even encrypted, over the network. ANGELs can also change (e.g., strobe) the keys they use to communicate with other ANGELs. ANGELS embedded in the secure processors can install and run ANGELs on other assets in the network and can be used to securely deliver cryptographic material and perform other security functions.

Modification to chip and manufacturing processes: To manufacture an ASIC chip that can detect hidden malware, the full chip design should not be revealed to the chip manufacturer. This means that the chip should be manufactured with at least one integral component that can be configured after manufacture. One such class of components are field programmable gate array (FPGA) components, which can be used to configure a chip after the ASIC stage of the manufacture is complete.

Data on paths flowing out of the chip need to be tested before data is released to external destinations. In at least some embodiments, a remote control mechanism is provided to photograph one or more critical parts of the chip, ideally, as the chip is manufactured, to confirm that the circuit design is adhered to, not including unintended circuits or circuit elements.

FIG. 1 presents a functional block diagram of an embodiment of a system 50 for ensuring during fabrication trustworthiness of electronic processor module. An electronic processor module is fabricated at an un-trusted fabrication facility 52. The manufacturer is provided with design and/or fabrication information 54 to manufacture the processor module. Such information can relate to one or more of hardware and software 56. As at least one measure of assuredness during fabrication, ANGEL software agents can be used to initiate secure communications between the un-trusted fabrication facility 52 and a trusted remote entity 60. Such communications can be used to one or more of provide design and or fabrication information and to monitor the fabrication process. For example, an inspection 58 performed at the un-trusted fabrication facility 52 can be remotely accomplished from the trusted remote entity 60.

Resulting electronic processing modules 64 comprising hardware and in at least some instances software determined to be trustworthy can be released into the stream of commerce, for example, as secure electronic processing modules, without fear that such modules were compromised during malware 62 at any time during fabrication.

At any point during manufacture or during operation when unauthorized circuits are uncovered or unauthorized data is found on the chip, the state of the chip can be permanently changed so that the chip can be remotely recognized as unsafe. An ability to reset an unsafe chip to a safe state, which was considered an important design element in the IBM 4758, may be a complicating luxury that is not necessary for the SPAN chip to be a successful commercial and military item. In FIG. 1 an example of an assembly line 100 is shown for ensuring during fabrication trustworthiness of electronic processor module. A processing module, or chip 102, is examined at various times during its fabrication by secure instruments. In the illustrative example, a first such instrument provides a trusted tester and/or monitor 104 is located at a first factory or manufacturing facility 106. Likewise, a second such instrument provides a trusted tester and/or monitor 108 is located at a second factory or manufacturing facility 110.

Considering fabrication of a module 102, such as an application specific integrated circuit (ASIC), part of the chip 102 can be manufactured in one factory 106, while another part of the chip, such as firmware loading, occurs in another factory 110. In at least some embodiments, firmware loading consists not only of programs but also of processor structure, such as a field programmable gate array (FPGA).

In at least some embodiments, each of the trusted testers and/or monitors 104, 108 are in communication with a trusted remote entity 112. In the illustrative example, the testers and/or monitors 104, 108 are in communication with the trusted remote entity through a communication infrastructure, such as the Internet 114, such that they can be controlled from a remote location.

The chip 102 is examined remotely by the first tester and/or monitor 104 at the first factory 106, and by the second tester and/or monitor 108 at the second factory 110. Preferably, each of the testers and/or monitors 104, 108 is tamper proof. In at least some embodiments, each of the testers and/or monitors 104, 108 also runs one or more respective software agents (e.g., ANGELS) that communicate with other agents (ANGELs), for example, at the remote control facility 112. Using additional security features, such as DASH technology, the ANGELs are able to download encrypted software and/or hashes and/or challenge and/or response functions and execute such software immediately on the respective testers and/or monitors 104, 108, send back results, and subsequently delete the software from the boxes. Such procedures can be configured to be automatic and difficult to reverse engineer, since the software arrives immediately before it is executed. As an addition measure of security, the same software is preferably not used for repeated tests.

The software downloaded for the first testers and/or monitor 104 can be designed to check out the hardware (e.g., ASIC) part of the manufacturing process and to send back results to the remote control facility 112. Alternatively or in addition, the tester and/or monitor 104 can be configured to imprint ID, or other suitable indicia, as well as other information onto the chip 102. In the example embodiment, the partially completed module or chip 102' is routed to the second factory 110 for completion. In the illustrative example, software downloaded for second tester and/or monitor 108 is designed to load firmware and an operating system environment onto an FPGA portion of the chip 102' as well as provide further inspection and/or verification of the chip 102'. A completed chip 102" having undergone inspections and or tests or other suitable controls according to the present disclosure results in a trustworthy module or chip that can be treated as "proven" not to contain malware.

In brief summary, an ASIC chip includes a secure processor which, because it runs a secure processing feature, such as the DASH software, is configured to securely network with other network elements, such as other SPAN chips. Moreover, modifications to the manufacturing process and design of the chip are implemented so that chips can be remotely controlled during manufacture to prevent the introduction of hidden malware 116.

In at least some embodiments, attempts to hide an inert module or circuit on the chip during manufacturing process designed to avoid detected at time of manufacture, can be detected by securely installing firmware allowing for the detection of such modules when they become active. Alternatively or in addition, one or more of the testers and/or monitors 104, 108 can provide for visual inspection of the chip 102 to aid in the detection of physical tampering and/or the inclusion of unauthorized modules and/or circuits. Such detection can be achieved by comparison of a visual image of the chip with a reference standard.

Beneficially, the SPAN chip is relatively easier to use and less expensive than competing products. The SPAN chip can be provided in a military and a commercial version, the commercial version embodied in such commercial products as a desk top and a smart phone.

Figure 3:
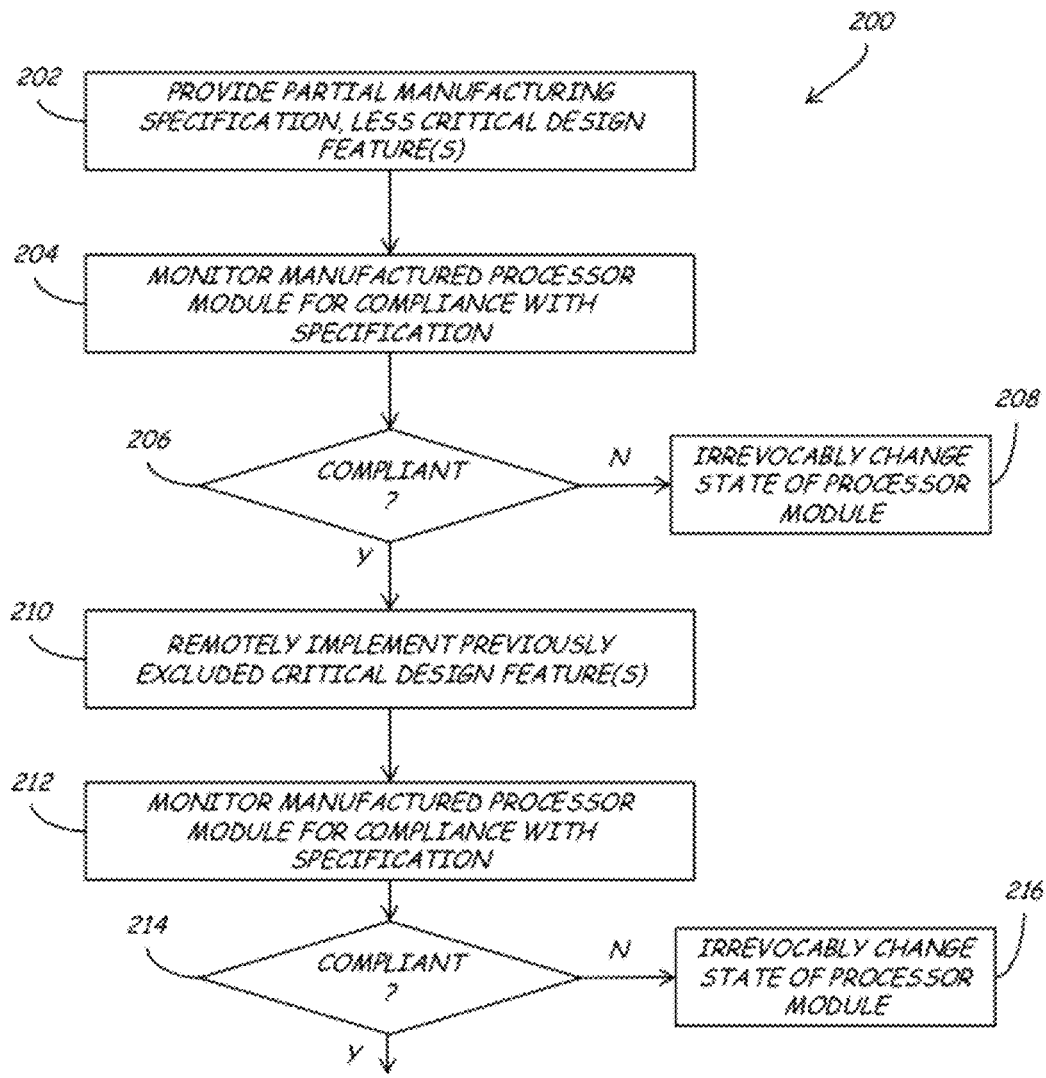
FIG. 3 presents a flow diagram of an embodiment of a process for ensuring during fabrication trustworthiness of electronic processor module.

FIG. 3 presents a flow diagram of an embodiment of a process 200 for ensuring during fabrication trustworthiness of electronic processor module. Partial manufacturing specification, less critical design feature(s) is provided at 202. Manufactured processor module is monitored for compliance with specification at 204. A determination as to whether the chip is compliant with the design specification is established at 206. Upon a determination that the module is not compliant, a state of processor module is irrevocably changed at 208. Alternatively, upon a determination that the module is compliant, previously excluded critical design feature(s) are remotely implemented at 210. Manufactured processor module is monitored for compliance with specification at 212. A second determination as to whether the chip is compliant with the design specification with regard to the previously excluded critical design features is established at 214. Similarly, upon a determination that the module is not compliant, a state of processor module is irrevocably changed at 216.

Figure 4:
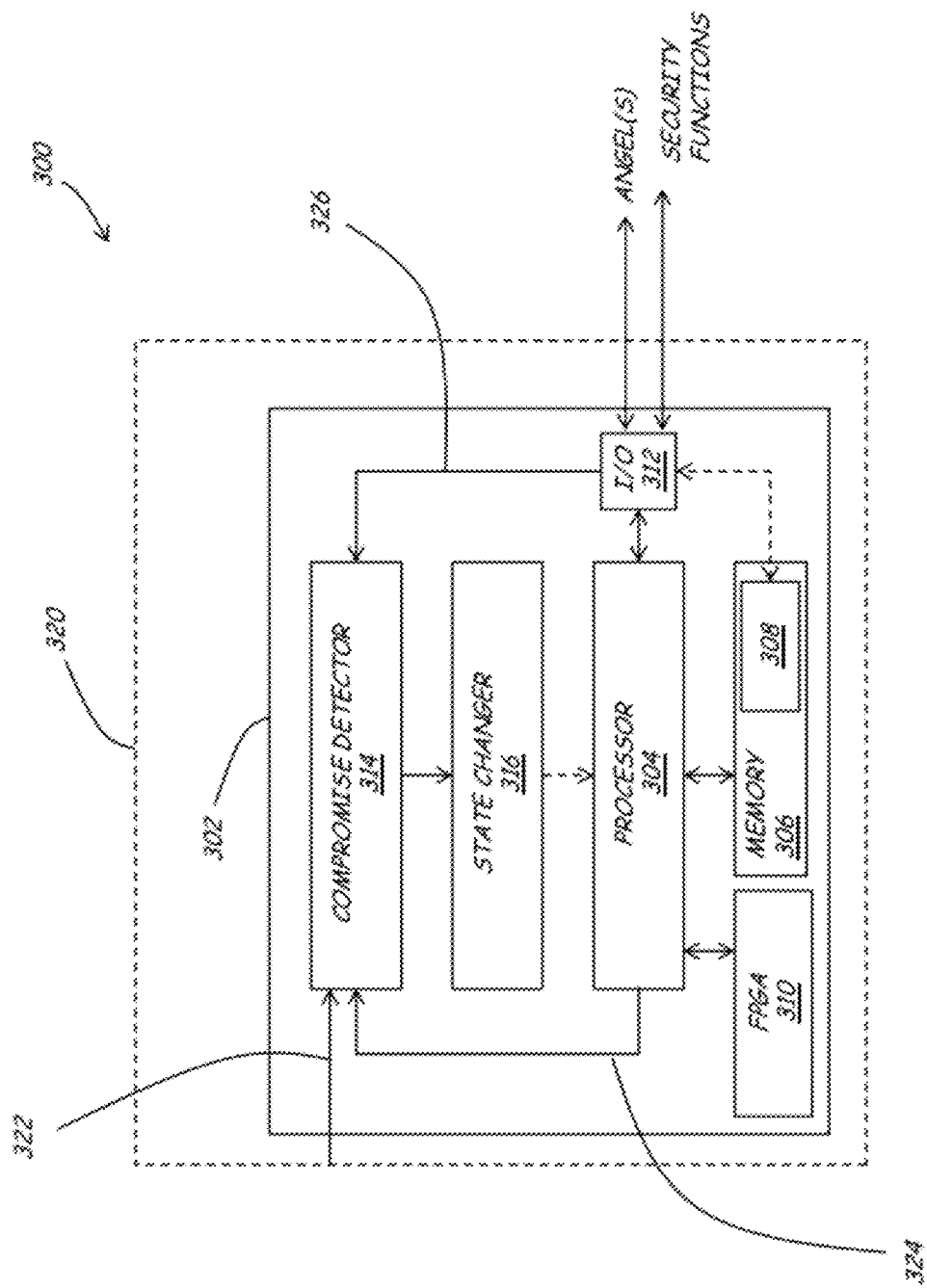
FIG. 4 presents a functional block diagram of an embodiment of a secure processing module.

FIG. 4 presents a functional block diagram of an embodiment of a secure processing assembly 300. The secure processing assembly 300 includes a trustworthy processing module 302, for example, fabricated according to the techniques described herein. The trustworthy processing module 302 includes a processor 304, a memory 306 configured with an ANGEL 308, a configurable element, such as an FPGA 310, and an input/output (I/O) module 312. The processor 304 is in communication with each of the memory 306, the FPGA 310 and the I/O module 312, allowing execution of pre-programmed instructions, for example, stored in the memory 306 and communication with external entities through the I/O module 312.

In at least some embodiments, the trustworthy processing module 302 includes a compromise detector 314 and a state changer 316. In at least some embodiments, the trustworthy processing module 302 is substantially enveloped by a security envelope 320. For example, the security envelope 320 can be similar to that provided for the IBM 4758. Alternatively or in addition, the security envelope 320 can include one or more conductors forming a circuit or mesh and adapted to detect a breach thereof. Such a breach of the physical security envelope 320 is forwarded or otherwise conveyed 322 to the compromise detector 314. Likewise, in at least some embodiments, the compromise detector 314 receives an indication 324 from the processor 304 as to the presence of unauthorized data as may be detectable by the presence of unauthorized stored data and/or activation of an inert malware module. Alternatively or in addition, the compromise detector is also configured to detect any attempts at unauthorized access (e.g., read and/or write) 326 as may be detected through the I/O module 312.

The compromise detector 314 can be configured to activate the state changer 316 in response to detections or similar indications from any or all of the various unauthorized access detection features 322, 324, 326. In response to such activation, the state changer 316 is configured to invoke an irrevocable state change to the trustworthy processing module 302. For example, the state changer 316 can alter a state of the processor 304, for example, by writing a predetermined value to a protected register, presence of the predetermined value being indicative of such a state change. Alternatively or in addition, the state changer 316 can write date to the memory, and/or delete data from the memory to similarly invoke such a state change. In at least some embodiments, the state changer 316 imparts a physical change to one or more components of the trustworthy processing module 302. Such physical changes can include configuring an FPGA, and/or physically destroying or otherwise altering one or more components and/or circuits of the trustworthy processing module 302. Such physical changes can be implemented, for example, by release of kinetic energy and/or thermal energy as may be achieved by a chemical reaction, an electrical reaction, and or a mechanical action.

Figure 5:
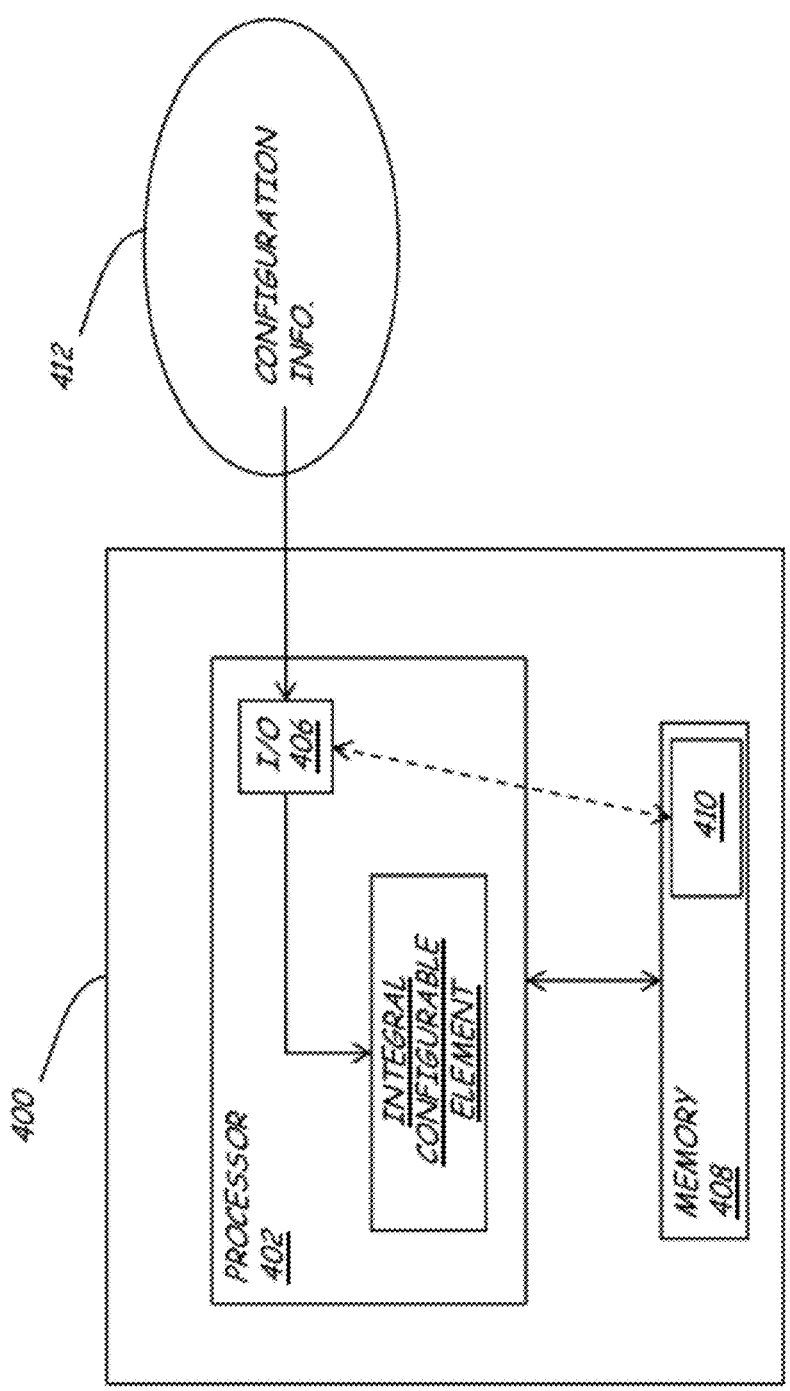
FIG. 5 presents a functional block diagram of an embodiment of a secure processing ASIC module.

FIG. 5 presents a functional block diagram of an embodiment of a secure processing ASIC module 400. The ASIC module 400 includes a trustworthy processing module 402 including at least one integral and configurable element, such as an FPGA 404. In at least some embodiments, the ASIC module 400 also includes an electronically accessible memory 408 that can be configured to include instructions corresponding to one or more ANGELs 410. In at least some embodiments, the ASIC module 400 also includes an I/O module 406, by which the ASIC module can communication with external entities, such as a trusted facility 412.

The trusted facility can provide configuration information to the trustworthy processing module 402 through the I/O module 406. In at least some embodiments, at least some of the one or more ANGELs 410 can be initiated on the trustworthy processing module 402 and at the trusted facility 412 to provide secure (e.g., encrypted) communications between the trusted facility 412 and the ASIC module 400, without requiring that the ASIC module 400 be pre-configured with any secret information, such as encryption keys. Such material can be provided as needed from the remote facility 412 by the ANGELs 410.

Whereas many alterations and modifications of the present disclosure will no doubt become apparent to a person of ordinary skill in the art after having read the foregoing description, it is to be understood that the particular embodiments shown and described by way of illustration are in no way intended to be considered limiting. Further, the invention has been described with reference to particular preferred embodiments, but variations within the spirit and scope of the invention will occur to those skilled in the art. It is noted that the foregoing examples have been provided merely for the purpose of explanation and are in no way to be construed as limiting of the present disclosure.

While the present disclosure has been described with reference to example embodiments, it is understood that the words, which have been used herein, are words of description and illustration, rather than words of limitation. Changes may be made, within the purview of the appended claims, as presently stated and as amended, without departing from the scope and spirit of the present disclosure in its aspects.

Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

I claim:

1. A method of making a trustworthy electronic processing module, comprising:
   providing remotely, by a system comprising a processor, an untrustworthy fabrication facility with a partial technical specification of the electronic processing module, intentionally excluding a critical hardware design feature of the electronic processing module to obtain an excluded critical hardware design feature during the fabrication of the electronic processing module at the untrustworthy fabrication facility;
   monitoring, by the system, from a trustworthy remote location, manufacture of the electronic processing module;
   implementing remotely, by the system, from a trustworthy facility remote from the untrustworthy fabrication facility, the excluded critical hardware design feature, thereby completing manufacture of the trustworthy electronic processing module; and
   monitoring, by the system, from a trustworthy remote location, one of trustworthiness of the electronic processing module, manufacturing methods of the untrustworthy fabrication facility, or both, and where the critical hardware design feature corresponds to a semiconductor chip design,
   wherein tests for manufacturing integrity at the untrusted fabrication facility comprise using orthogonal values from a scenario in which the module is being fabricated.

2. The method of claim 1, further comprising irrevocably changing, by the system, a state of the electronic processing module responsive to the monitoring detecting a lack of trustworthiness.

3. The method of claim 2, wherein the irrevocably changing of the state of the electronic processing module renders the electronic processing module unfit for an intended purpose.

4. The method of claim 1, wherein the monitoring occurs during subsequent use of a manufactured electronic processing module.

5. The method of claim 1, wherein the implementing remotely of the excluded critical hardware design feature comprises enabling, by the system, communication between the electronic processing module and the trustworthy remote location using a controlled-access agent process.

6. The method of claim 1, wherein one of the monitoring, the implementing, or both are accomplished by:
   instantiating, by the system, at a trustworthy location remote from the untrustworthy fabrication facility, executable software in the electronic processing module to obtain instantiated executable software enabling the one of the monitoring, the implementing or both, wherein the instantiating occurs immediately prior to execution of the executable software; and
   rendering inoperable, by the system, the instantiated executable software immediately subsequent to execution.

7. The method of claim 6, wherein at least one of instantiating and removing comprises pre-enabling, by the system, communication between the electronic processing module and the trustworthy facility using a controlled-access agent process.

8. The method of claim 2, wherein irrevocably changing the state of the electronic processing module is detectable by monitors of subsequent manufacturing processes of the electronic processing module.

9. The method of claim 1, wherein the monitoring of the trustworthiness of the electronic processing module comprises inserting, from a remote monitor, executable software into the electronic processing module to obtain inserted monitoring, wherein the inserting of the software occurs immediately before execution of the executable software.

10. The method of claim 9, wherein the inserting of the software to obtain inserted software immediately before execution minimizes exposure of the inserted software to a manufacturing process of the electronic processing.

11. The method of claim 10, further comprising inserting software into the remote manufacturing process to obtain inserted software, wherein the software is inserted just in time into the manufacturing process.

12. The method of claim 10, wherein the inserted software imprints a number into the module, while being fabricated at one facility responsive to an investigation undertaken by the software, and wherein the remote monitor tests the number later in the manufacturing process at a second fabrication facility.

13. The method of claim 12, wherein the tests at the second fabrication facility involves tests developed just-in-time that do not require the number being sent outside the module being manufactured.

14. The method of claim 1, wherein the monitoring comprises:
   obtaining an image of a hardware design of the electronic processing module as the manufacture of the electronic processing module proceeds to obtain an image of a manufactured hardware design of the electronic processing module; and
   comparing the image of the manufactured hardware design with a correct hardware design.

15. A machine-readable storage medium, comprising executable instructions which, responsive to being executed by a processor, cause the processor to perform operations comprising:
   providing remotely, by a system comprising a processor, an untrustworthy fabrication facility with a partial technical hardware specification of an electronic processing module, intentionally excluding a critical hardware design feature of the electronic processing module to obtain an excluded critical hardware design feature during the fabrication of the electronic processing module at the untrustworthy fabrication facility;
   monitoring, by the system, from a trustworthy remote location, manufacture of the electronic processing module;
   implementing remotely, by the system, from a trustworthy facility remote from the untrustworthy fabrication facility, the excluded critical hardware design feature, thereby completing manufacture of the electronic processing module; and
   monitoring, by the system, from a trustworthy remote location, one of trustworthiness of the electronic processing module, manufacturing methods of the untrustworthy fabrication facility, or both, and where the critical hardware design feature corresponds to a semiconductor chip design,
   wherein tests for manufacturing integrity at the untrusted fabrication facility comprise using orthogonal values from a scenario in which the module is being fabricated.

16. The machine-readable storage medium of claim 15, further comprising irrevocably changing a state of the electronic processing module responsive to the monitoring detecting a lack of trustworthiness.

17. The machine-readable storage medium of claim 15, wherein one of the monitoring, the implementing, or both are accomplished by:
   instantiating remotely from a trustworthy remote location and immediately prior to execution, executable software to obtain instantiated executable software enabling one of the monitoring, the implementing or both; and
   rendering inoperable the instantiated executable software immediately subsequent to execution.

* * * * *